March 8, 1960 E. F. KOHL 2,927,440
APPARATUS FOR MAKING ICE AND TO IMPROVED CONTROL MEANS THEREFOR
Filed Nov. 8, 1954 6 Sheets-Sheet 1

INVENTOR
Everard F. Kohl
BY John Mahoney
ATTORNEY

March 8, 1960     E. F. KOHL     2,927,440
APPARATUS FOR MAKING ICE AND TO IMPROVED CONTROL MEANS THEREFOR
Filed Nov. 8, 1954     6 Sheets-Sheet 2

INVENTOR
*Everard F. Kohl*
BY *John Mahoney*
ATTORNEY

March 8, 1960           E. F. KOHL           2,927,440
APPARATUS FOR MAKING ICE AND TO IMPROVED CONTROL MEANS THEREFOR
Filed Nov. 8, 1954                        6 Sheets-Sheet 4

INVENTOR
Everard F. Kohl
BY John Mahoney
ATTORNEY

United States Patent Office 2,927,440
Patented Mar. 8, 1960

2,927,440

APPARATUS FOR MAKING ICE AND TO IMPROVED CONTROL MEANS THEREFOR

Everard F. Kohl, Lakewood, Ohio

Application November 8, 1954, Serial No. 468,009

23 Claims. (Cl. 62—138)

The present invention relates to apparatus for and to an improved process of preparing ice. It also relates to control means for use in connection with such apparatus.

In many establishments, ice in the form of fragments is preferred to ice which is in the form of cubes or is in a finely divided state, and it is an object of the present invention to provide an improved apparatus for preparing ice in such form in which the thickness of the ice and the size of the fragments which are formed may be regulated.

Another object of the invention is to provide improved apparatus for forming a layer of ice of the desired thickness upon a portion of the refrigerating apparatus, such as upon a thermally conductive plate, and in which means are provided for heating the upper surface of the plate to a sufficient extent to release the layer of ice from the plate when the ice has attained the desired thickness, for moving the layer of ice into contact with breakers for breaking the ice into fragments of the desired size and passing it into a bin, and for automatically continuing the process until the quantity of ice in the bin reaches a predetermined level.

A further object of the invention is to provide an improved process of manufacturing ice in fragmentary form by means of which the ice is comparatively free from cloudiness.

Another object of the invention is to provide improved control means for ice making machines in which refrigeration is initiated to build up a layer of ice of a predetermined thickness upon a portion of the apparatus, independent of the ambient temperature of the atmosphere in which the machine is located, and in which means are provided for interrupting the refrigeration when the ice attains a predetermined thickness.

A still further object of the invention is to provide improved control means for ice making machines for simultaneously causing the flow of water over a thermally conductive plate and cold vapors in heat exchange relation with the plate for sufficient time to provide a layer of ice of the desired thickness upon the plate, for then heating the plate to a sufficient extent to release the layer of ice from the plate, for conveying the released layer of ice from the plate, and for again restoring the parts to their original positions to enable the cycle to be repeated.

My invention will be better understood by reference to the accompanying drawings in which.

In accordance with the present invention, a suitable frame is provided in which a plate 1 is mounted, which plate is formed of a thermally conductive material, such as copper, aluminum, or steel. The frame also serves to support a water circulating system for passing water over the plate and a refrigeration system having an evaporator in the form of coils arranged beneath and in heat exchange relation with the plate to freeze water passed over the plate into a layer of ice when cold vapors are passed through the coils. Means are also provided for interrupting the flow of cold vapors beneath the plate when the layer of ice that is formed thereon attains a predetermined thickness, and for heating the upper surface of the plate to a sufficient extent to release the layer of ice which is formed so that it may be conveyed therefrom and while any suitable heating means may be provided for this purpose, as shown, conduit means leading from the compressor to the evaporator coils is provided in the refrigeration system by means of which warm vapors may be passed from the compressor of the refrigeration system through the evaporator coils arranged beneath the inclined plate, and means are then provided for conveying the layer of ice into contact with rotary breakers for breaking the ice into fragments of the desired size and passing them into a bin arranged adjacent to one end of the frame.

While the frame may be of any desired construction, as illustrated in the drawings, it consists of a plurality of angle-shaped corner posts 2, 3, 4 and 5 which are connected together at their upper and lower ends and centrally thereof by angularly-shaped braces and between which are inserted panels which are preferably formed of a thermally insulating material to form side walls 6 and 7, end walls 8 and 9, and top and bottom walls 10 and 11.

Figure 7:
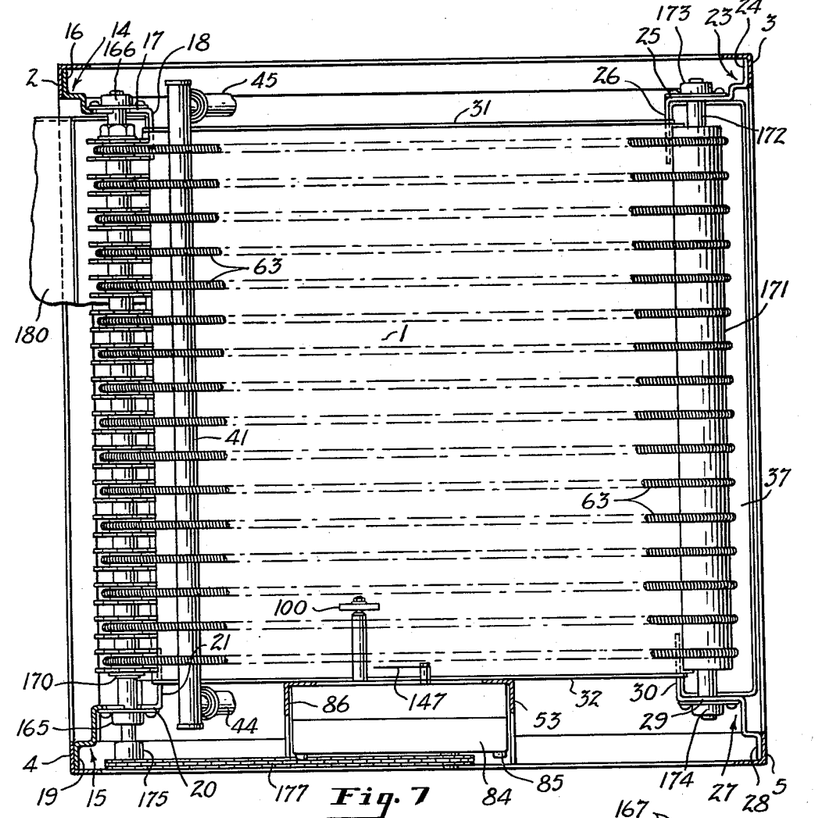
Fig. 7 is a plan view of the machine with parts in section and with parts of the ice chute being shown broken away.

The thermally conductive plate 1 forms the top wall of a box 12 to which it may be secured by suitable means, such as welding, which box contains a thermally insulating material, such as an ester gum or fiber glass, and means are provided for supporting the box in place so that the plate 1 will be inclined at an acute angle, such as from approximately 20° to 25° to the horizontal. For supporting the upper end of the box, a pair of brackets 14 and 15 are provided as shown more particularly in Figs. 7 and 8, bracket 14 having a flange 16 secured to corner post 2 by suitable means, such as welding, a wall 17 offset with respect to flange 16 and extending at substantially right angles thereto, and a flange 18 which extends beneath an extension on plate 1 as shown more particularly in Fig. 8, and in a like manner, bracket 15 is provided with a flange 19 which is secured to corner post 4 by suitable means, such as welding, a wall 20 offset with respect to flange 19 and extending at substantially right angles thereto and an inwardly extending flange 21 which is arranged below the opposite side of the extension on plate 1.

The lower portion of plate 1 is supported in a somewhat similar manner. As shown, a bracket 23 is provided having a flange 24 secured to corner post 3 by suitable means, such as welding, at a position below bracket 14, a wall 25 offset relative to flange 23 and extending at substantially right angles thereto, and a flange 26 arranged below a lower extension on plate 1, and a similar bracket 27 is provided having a flange 28 secured to corner post 5 by suitable means, such as welding, at a position below bracket 15, an inwardly offset wall 29 extending at substantially right angles to flange 28, and a flange 30 arranged below the lower extension on plate 1.

Box 12 is also provided with side walls 31 and 32 which extend above plate 1 and a water distribution system is provided for passing water over plate 1 between side walls 31 and 32. As shown, the water distribution system is arranged above a drain plate 33 which divides the frame into upper and lower compartments 34 and 35, respectively. The drain plate is supported by angle irons 36 and 36a, angle iron 36 being arranged between corner posts 4 and 5 and angle iron 36a being arranged between corner posts 2 and 3.

The water distribution system includes a tank 37, the upper end portion of which terminates in an outwardly extending peripheral flange 38 which is secured by suitable means, such as welding, to lower brackets 23 and 27, a pump 39, a motor 40 for driving the pump, a tube 41 arranged over plate 1, the opposite end portions of which are supported in notches formed in the side walls 31 and 32 of box 12, conduit means 41a arranged between the tank 37 and the inlet of the pump, a coupling secured to the outlet end of the pump and having a pair of conduit means 42 and 43 extending at substantially right angles to each other, a pair of flexible tubes 44 and 45, one end of tube 44 being connected to conduit means 42 and the other end being connected to one end of a coupling 46 which is secured to a conduit means 47 extending downwardly from one end of tube 41, and in a like manner, one end of tube 45 is connected to conduit means 43 and its other end is connected to one end of a coupling 48 which is secured to a conduit means 49 extending downwardly from the opposite end of tube 41.

The motor 40 and pump 39 may be supported in position by any suitable means. As shown, motor 40 is secured to the upper wall of a U-shaped bracket 50 which has outwardly extending flanges 51 secured to one of the side walls of an angular-shaped member 52. The other wall of member 52 is secured to the inwardly extending side wall of an angle iron 53, which, in turn, is secured to the frame of the machine.

The water from tank 37 which is frozen on plate 1 is replenished from a suitable source of supply through conduit means 54 which extends through a tubular member 55 formed in drain plate 33 and is secured to a coupling 56 extending through tank 37, the opposite end of which coupling is provided with a discharge orifice which is opened and closed by valve means 57 pivotally mounted on a bracket 58 secured to the inner wall of the tank and to maintain the water at the desired level, the valve means is controlled by a float 59 which actuates the valve to open the discharge orifice when the water in tank 37 falls below the desired level and close the orifice when the water rises to the desired level.

From the structure so far described, it will be apparent that when motor 40 is energized, water is drawn from the bottom portion of tank 37 through conduit means 41 to the inlet of the pump and the water is divided at the outlet end of the pump, part of the water passing through flexible tube 44, coupling 46, and conduit means 47 to one end of the tube 41 and the remainder passing through flexible tube 45, coupling 48, and conduit means 49 to the other end of tube 41, and means are provided for uniformly distributing the water over the plate. For this purpose, the tube 41 is provided with removable plugs 60 at its opposite ends and with a narrow slot or a plurality of closely spaced apertures or orifices 61, and means, such as a coil spring 62, is arranged within the tube 41.

Figure 5:
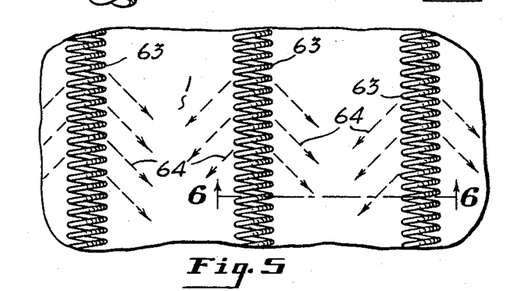
Fig. 5 is an enlarged detail view showing a portion of the thermally conductive plate and a plurality of coil springs arranged over the plate.

Means are also provided for diverting the water to prevent the water from becoming cloudy during the freezing cycle and while any suitable means may be provided for this purpose, as shown, a plurality of spaced coil springs 63 arranged over and in close proximity to plate 1 are provided which cause the water to flow in a substantially herringbone pattern adjacent each spring as indicated by the arrows 64 shown in Fig. 5 of the drawing. Springs 63 are formed of a thermally conductive metal, such as bronze or stainless steel. They therefore not only serve to divert the water flowing over plate 1 but they also aid in freezing the water upon the plate when cold vapors are passed in heat exchange relation with the plate. They also function as part of the ice conveying means as will be subsequently described.

Figure 1:
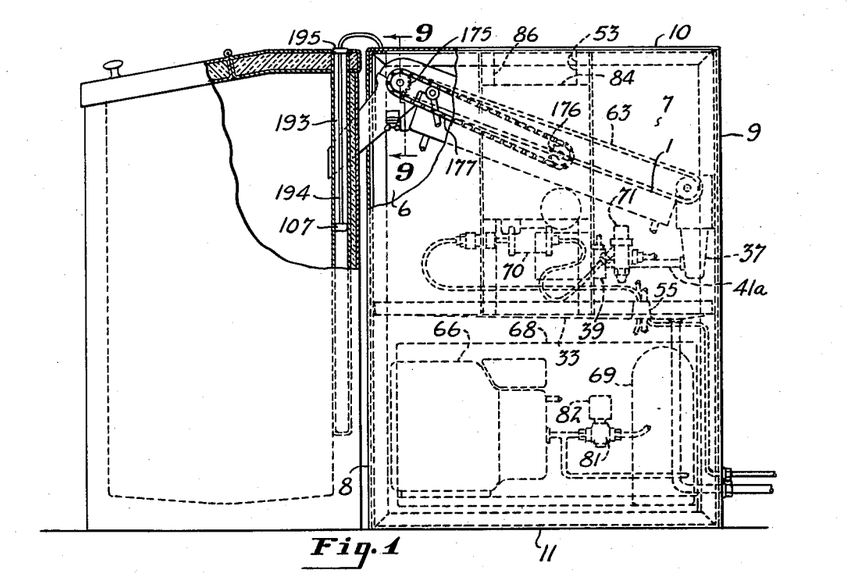
Fig. 1 is a side elevational view of the improved machine and an ice bin arranged at one end thereof, parts being shown broken away and parts in section.
Figure 2:
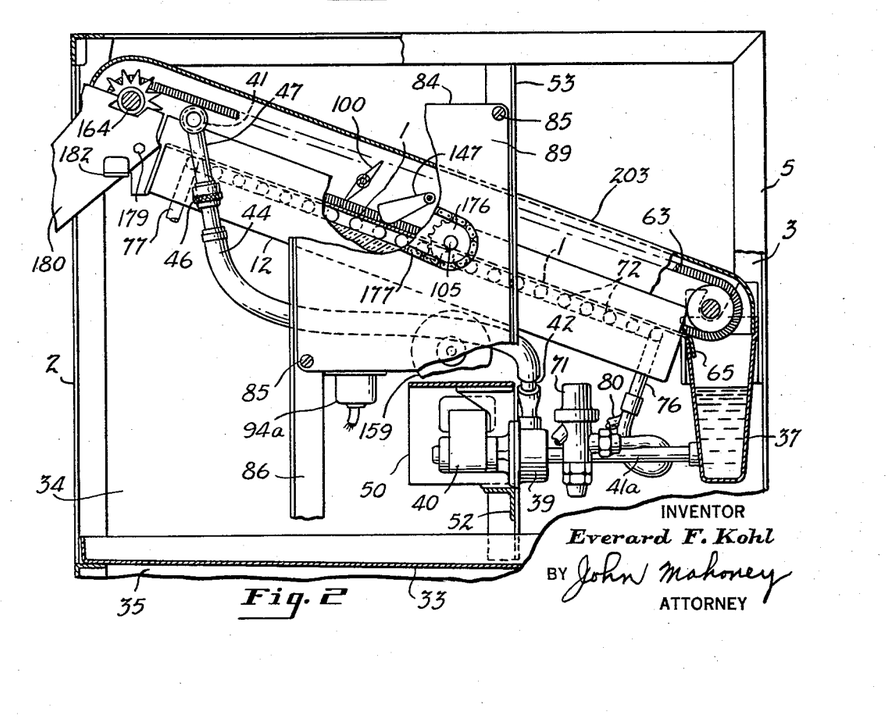
Fig. 2 is an enlarged side elevational view of the upper portion of the machine with the side casing removed, showing parts in section and parts broken away to show adjacent structure.
Figure 3:
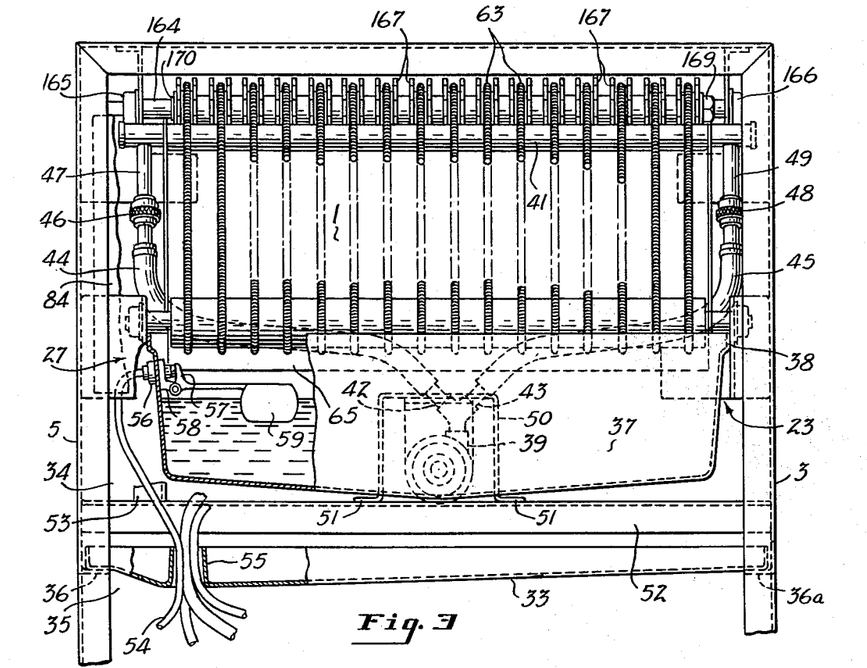
Fig. 3 is an end elevational view of the upper portion of the machine with the cover removed and with parts shown in section.
Figure 4:
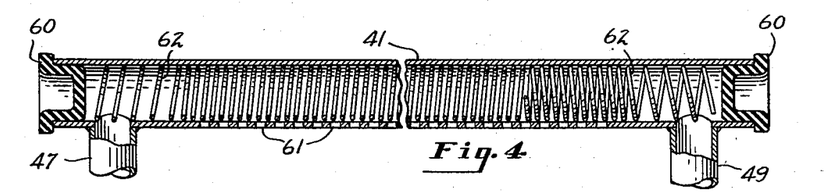
Fig. 4 is a sectional view of a pipe forming part of the water circulating system and conduit means secured to the pipe adjacent each end thereof, which conduit means are shown partly in elevation and partly in section.

As shown in Fig. 2, plate 1 is extended at its lower portion and is provided with a downwardly extending flange 65 which projects into tank 37 and means are provided for freezing a portion of the water which flows over the plate and for cooling the remainder of the water which is again distributed over the plate by the pump and associated conduit means until a layer of ice of a predetermined thickness is formed upon the plate. For this purpose, a refrigeration system is provided as shown more particularly in Figs. 1 and 16 for simultaneously passing cold vapors in heat exchange relation with the plate while water is passing over its upper surface.

Figures 8, 9:
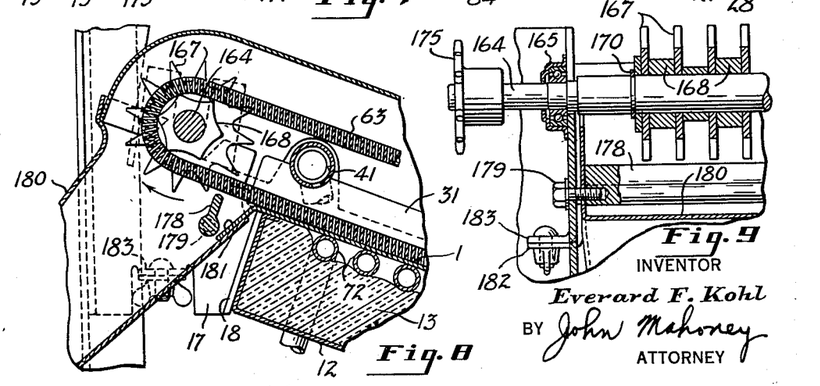
Fig. 8 is a detail sectional view of the breaker bar and conveying mechanism and elements contiguous thereto with parts shown in elevation.
Fig. 9 is a detail sectional view on a plane taken through the line 9—9 of Fig. 1, showing parts in elevation.

The refrigeration system is of the usual type and consists of a compressor 66 having a built-in motor 67, a condenser 68 which may be of the water or air-cooled type, a receiver 69, a drier 70, an expansion valve 71, and an evaporator which as shown more particularly in Figs. 2 and 8 is in the form of coils 72 which are arranged beneath and secured to plate 1. If the condenser is of the air-cooled type, suitable means, such as fans, not shown, may be provided for blowing air over the condenser. In such systems, the refrigerant, which may be of any suitable type, such as dichlorodifluoromethane (Freon 12), is compressed in the compressor and is then passed to the condenser through conduit means 73 where heat is extracted therefrom by the cooling fluid which converts the compressed vapors into a liquid state. The refrigerant which is under pressure then passes through conduit means 74 to receiver 69 and from the lower portion of the receiver through conduit means 75 to a drier 70 which contains a suitable desiccant for removing water and then flows through an orifice in an expansion valve 71 and through conduit means 76 to coils 72 arranged beneath plate 1 and from the discharge end of coils 72 through conduit means 77 to the suction inlet of the compressor. While expansion valve 71 may be of any desired type, it is preferably of the thermostatic type in which the size of its outlet orifice is controlled by a bulb 78 arranged adjacent conduit means 77 which bulb is connected by means of a capillary tube 79 to a chamber above a thermostatic bellows in the expansion valve.

The cold vapors passing through coil 72 which is in heat exchange relation with plate 1 freezes a portion of the water flowing over the plate, forming a layer of ice which gradually builds up to the desired thickness. Means are then provided to heat the upper surface of plate 1 so that the layer of ice may be removed therefrom and while any suitable means may be provided for this purpose, such as a suitable resistor arranged below the plate which may be heated by electrical energy, as shown, the refrigeration system is provided with conduit means 80 which by-passes the condenser, receiver, drier, and expansion valve, and is connected to conduit means 76 leading to the evaporator coils. Conduit means 80 has a spring-pressed valve 81 therein which normally maintains the valve in closed position. Valve 81 is provided, however, with a solenoid 82 surrounding its stem which when energized opens the valve to permit warm vapors to flow directly from the compressor through conduit means 80 to evaporator coils 72. When warm vapors pass through conduit means 80 to the evaporator, vapors in the condenser have the tendency to flow backward through conduit means 73 and mingle with the warm vapors from the compressor. The backward flow of vapors from the condenser will not usually be sufficient to appreciably affect the temperature of the vapors flowing through conduit means 80. If desired, however, a one-way check valve may be provided in conduit means 73 which permits vapors to flow through conduit means 73 to the condenser 68 when valve 81 is closed but which prevents the reverse flow of such vapors when valve 81 is open.

In accordance with the present invention, improved control means is provided for energizing motor 40 to drive the water pump to cause water to flow over plate 1 and for energizing the motor in the compressor to cause the simultaneous flow of cold vapors through the evaporator coils 72 to freeze water flowing downwardly over the plate until the layer of ice which is formed attains the desired thickness. Means associated with the layer of ice which is formed and the control means is also provided which becomes effective when the ice which is formed upon the plate attains the desired thickness for interrupting the circuit to the motor which drives the water pump and for energizing the solenoid 82 surrounding the stem 83 of valve 81 in the by-pass conduit means for opening the valve to permit warm vapors to flow from the compressor through the coils of the evaporator for heating the upper surface of the plate to a sufficient extent to release the layer of ice from the plate, and means responsive to the release of the layer of ice from the plate are provided for energizing a motor for conveying the layer of ice into contact with breakers for breaking the ice into fragments and for passing the fragments into an ice bin. Means associated with the motor which rotates the breakers are also provided for restoring the parts to their original positions to repeat the cycle after the layer of ice has been removed from the plate, and means associated with the bin and the control means are provided for shutting off the machine when the ice in the bin attains a predetermined level.

As shown in Figs. 1, 2, 7, 10 and 11, the control means is arranged within a box 84 which is secured by suitable means, such as bolts 85, to one of the side walls of angle iron 53 and to one of the side walls of an angle iron 86 suitably spaced from angle iron 53 which form part of the frame of the machine. The box consists of a rear wall 88 arranged adjacent one side of plate 1, a front wall 89, side walls 90 and 91, and top and bottom walls 92 and 93, respectively, and secured to the bottom wall 93 is a plug receptacle 94 provided with a plurality of terminals to which conductors leading from a source of electrical energy may be removably secured by a plug 94a arranged outside of the housing.

Figure 16:
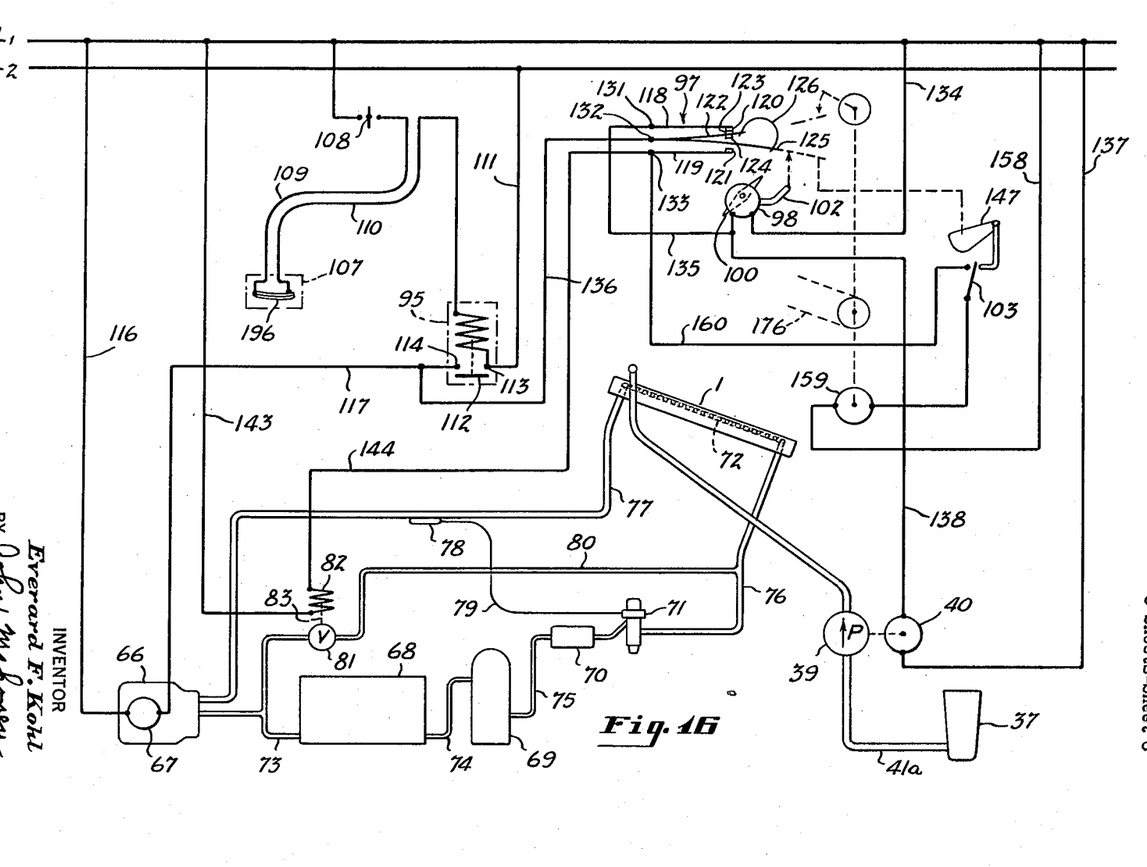
Fig. 16 is a diagrammatical view of the refrigeration and control systems.

As illustrated more particularly in Figs. 10 to 12 and 16, the control means includes a relay 95 which is maintained in place by a bracket 96 secured to the rear wall of the box, a switch 97, a motor 98, see Fig. 16, arranged within a motor housing 99 for rotating an element, such as a finger 100, extending over plate 1 to which motor housing is secured a gear casing 101 having an arm 102 fixed thereto for actuating switch 97, a second switch 103 secured to the rear wall 88 of the control box for energizing a motor having a shaft extending into the control box which shaft is provided with a pinion 104 for rotating a shaft 105 extending through the front wall of the box through speed reducing gearing. The control means also includes a second speed reducing gear train and an actuating arm 106 secured to the final gear of the second gear train for moving the actuating arm of switch 97 to restore the parts to their original positions. Means including a thermostatic switch 107 arranged within the ice bin is also provided for interrupting the supply of electrical energy from line $L_1$ to the relay for shutting off the machine when the ice in the bin attains a predetermined level.

The control means will be more specifically described in connection with the operation of the machine and the wiring and refrigeration diagram shown in Fig. 16 of the drawing. Assuming that the plug 94a is attached to the plug receptacle 94 to provide an electrical connection between the line and terminals arranged within the control box, that the ice bin is empty or partly filled with ice, and that the thermostatic switch therein is closed, when switch 108 connected to line $L_1$ is closed, a circuit is established from line $L_1$ through switch 108, conductor 109, switch 107, and conductor 110 to relay 95 and from relay 95 through conductor 111 to line $L_2$. Relay 95 is provided with an arm 112 which is normally maintained by suitable means, such as a spring, in spaced relation to contacts 115 which contacts are electrically connected to terminals 113 and 114. When the coil of relay 95 is energized, however, arm 112 is moved into engagement with and bridges contacts 115, and a second circuit is established through conductor 116 to motor 67 of compressor 66 and through conductor 117, arm 112, and conductor 111 to line $L_2$, thereby causing cold vapors to flow through the evaporator coils arranged beneath plate 1.

Figure 10:
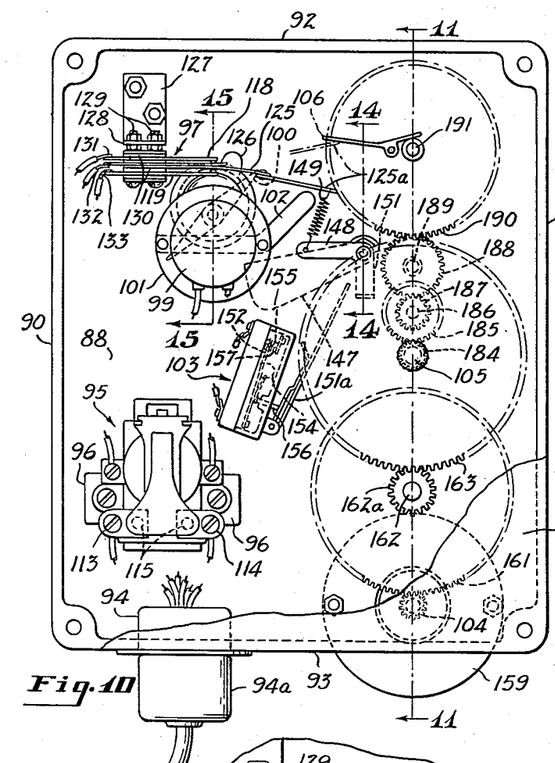
Fig. 10 is an elevational view of the control box, a major portion of the front wall of which is broken away to show the control means in elevation.
Figure 11:
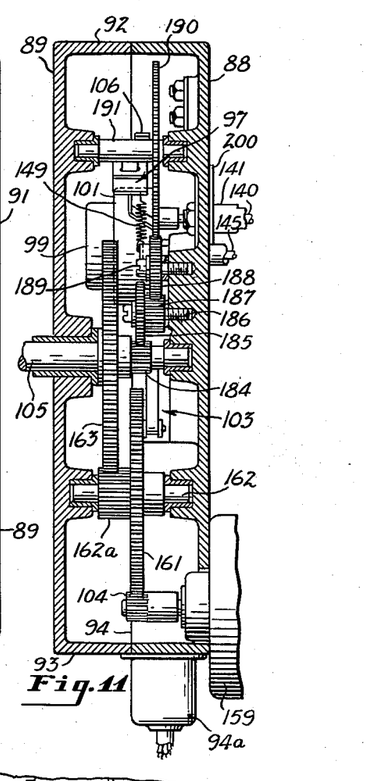
Fig. 11 is a cross sectional view taken on a plane passing through the line 11—11 of Fig. 10, looking in the direction of the arrows.

When the relay switch is closed, means are also provided for establishing circuits for energizing motor 40 to drive pump 39 and for energizing motor 98 to rotate finger 100 when the parts of switch 97 are in the positions shown in Figs. 10 and 16 of the drawings.

Figure 12:
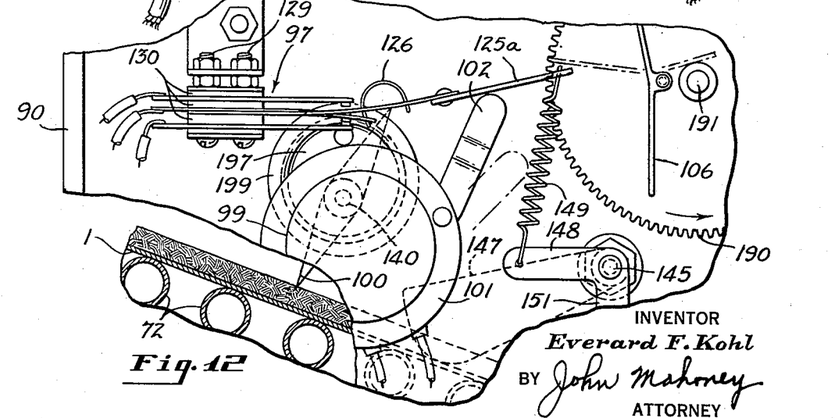
Fig. 12 is an enlarged detail view of a portion of the control means.
Figures 13, 14, 15, 17, 18:
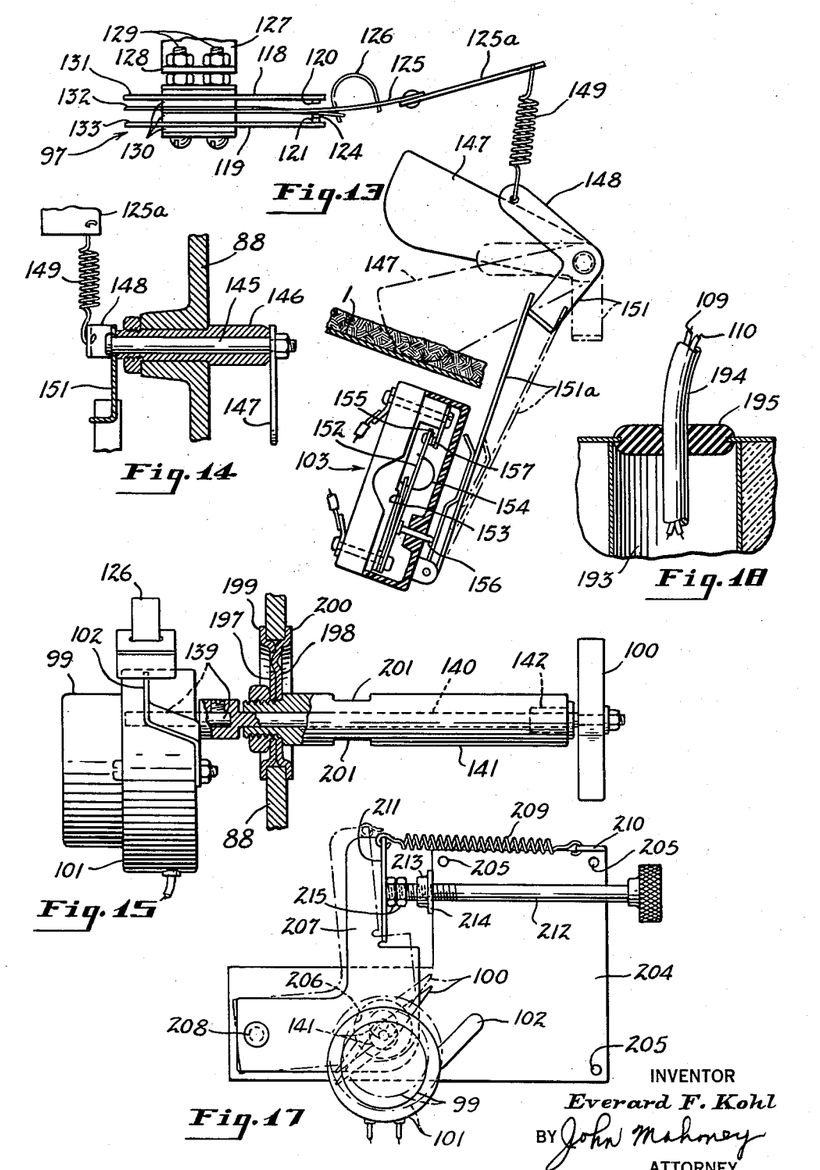
Fig. 13 is an enlarged detail view of a portion of the conductive plate and a portion of the control means, including two switches with the actuating means for one of the switches being shown in full lines in the actuated position of the switch and in dotted lines when the actuating means is released.
Fig. 14 is a detail cross sectional view and Fig. 15 is an elevational view with parts in section, showing other parts of the control means.
Fig. 17 is an elevational view of modified apparatus for regulating the thickness of the layer of ice which is formed upon the thermally conductive plate.
Fig. 18 is an enlarged cross sectional view of the upper portion of a well formed in the ice bin, showing means for frictionally maintaining a cable containing conductors in place.

Switch 97 is of the snap acting type as shown more particularly in Figs. 1 to 3 of Patent No. 2,558,219 granted to me on June 26, 1951, and consists of a pair of conductive arms 118 and 119, see Figs. 13 and 16, each of which is provided with a stationary contact 120 and 121, respectively, a flexible conductive blade 122 provided with movable contacts 123 and 124 on its opposite faces spaced inwardly from its free end, a conductive actuating arm 125 which is formed integral with or has its fixed end arranged adjacent the fixed end of blade 122, and a U-shaped spring 126 loosely connected to projections extending from the free end portions of blade 121 and actuating arm 125. When the switch parts are in the positions shown in Figs. 10 and 16, contact 123 on blade 122 is in engagement with the stationary contact 120 on arm 118 and when actuating arm 125 is moved to the position shown in Fig. 12, spring 126 throws blade 122 in the opposite direction to move contact 124 on blade 122 into engagement with stationary contact 121 on arm 119. When actuating arm 125 is moved in the opposite direction, the blade 122 is of course returned to its original position.

As shown in Figs. 10 and 13, switch 97 is secured to the upper portion of the rear wall 88 of the control box by means of a bracket 127 having an outwardly extending arm 128 and is held in place by bolts 129 extending through the switch parts which are held in place by nuts arranged on opposite sides of arm 128. Arms 118 and 119 are spaced from each other and from the actuating arm 125 and blade 122 by insulating strips 130 and the bolts may be insulated from the conductive parts of the switch by providing openings in the arms and blade which are spaced from the bolts or by insulating tubes in the usual manner. As shown, arms 118, 125 and 119 extend beyond the insulating strips to provide terminals 131, 132 and 133, respectively.

When relay 95 is closed and the parts of switch 97 are in the position shown in Fig. 16, a third circuit is established from line $L_1$ through conductor 134 to motor 98 and from motor 98 through conductor 135 to terminal 131 of switch 97 and then to stationary contact 120 and movable contact 123, and from movable contact 123 and arm 122 to terminal 132 and conductor 136 to arm 112 of relay switch 95 and from arm 112 to line $L_2$. A fourth circuit which is in parallel with the third circuit is also established from line $L_1$ through conductor 137 to motor 40 and from motor 40 through conductors 138 and 135 to terminal 132 of switch 97 and from terminal 132 to line $L_2$.

When the first four circuits are closed, motor 40 drives pump 39 which draws water from the tank 37 and distributes it through the water circulation system over the upper surface of the inclined plate and the cold vapors flowing in the evaporator coils in heat exchange relation with the plate gradually freeze the water upon the plate to form a layer of ice, and means including motor 98, finger 100, arm 102, and switch 97, are provided for interrupting the circuits to the pump motor 40 and motor 98 which rotates finger 100 when the layer of ice which is formed upon the inclined plate attains the desired thickness. As shown more particularly in Fig. 15 of the drawings, a shaft 139 is provided which extends through the gear casing in eccentric relation to the axis thereof which shaft serves to dependently support the motor and the gear casing and upon which the gear casing is rotatably mounted. A second shaft 140, the outer end of which is secured to shaft 139, extends through a bushing 141 mounted upon the rear wall 88 of the control box and a bearing 142 arranged in the inner end of bushing 141 serves to support finger 100 which is secured thereto. The shafts 139 and 140 are slowly rotated by motor 98 through a train of reducing gearing (not shown) arranged between the shaft of motor 98 and shaft 139 until the layer of ice formed upon plate 1 attains sufficient thickness to prevent rotation of finger 100.

Motor housing 99 and gear casing 101 are arranged below switch 97 as shown in Fig. 10 and when finger 100 engages the layer of ice to prevent rotation of shafts 139 and 140, motor 98 rotates motor housing 99 and gear casing 101 around shaft 139, thereby causing arm 102 which is secured to gear casing 101 to engage an arm or extension 125a secured to actuating arm 125 of switch 97 and moves actuating arm 125 and extension 125a upwardly to the positions shown in dotted lines in Fig. 10 and in full lines in Figs. 12 and 13.

When actuating arm 125 of switch 97 is moved upwardly, spring 126 throws blade 122 downwardly to disengage movable contact 123 from stationary contact 120 and forces contact 124 into engagement with stationary contact 121 as shown in Figs. 12 and 13, thereby interrupting the circuit to the pump motor and the circuit to motor 98, and establishes a circuit from line $L_1$ through conductor 143, solenoid 82, and conductor 144 to the terminal 133 of switch 97 and through stationary contact 121, movable contact 124, and arm 122 to terminal 132 of the switch and from terminal 132 through the arm 112 of relay 95 to line $L_2$. The energization of solenoid 82 opens valve 83 which permits warm vapors to flow directly from the compressor through conduit means 80 and 76 to the evaporator coils 72, thereby heating the upper surface of plate 1 to release the layer of ice therefrom, and means responsive to the release of the layer of ice from plate 1 are provided for conveying the layer of ice upwardly on plate 1 into engagement with the breaking mechanism for breaking the ice into fragments and for restoring the parts to their original positions so that the cycle may be repeated.

For this purpose a motor is provided for rotating a shaft upon which the breakers are mounted. This motor may be energized by suitable means, such as a circuit arranged in parallel with the circuit passing through solenoid 82 in which case the layer of ice which is frozen upon the plate will in conjunction with springs 63 which are embedded therein, stall the motor until plate 1 is heated to sufficient extent to release the layer of ice. The energization of the motor which rotates the breaker shaft may, however, be retarded by suitable means until the layer of ice is released from the plate. For instance, a thermostatic switch may be arranged in series with the motor which switch may be actuated by the expansion of a fluid in a bulb arranged adjacent the by-pass conduit means 80 which bulb may be connected to the thermostatic switch by suitable means, such as a capillary tube, and when the fluid within the bulb expands sufficiently, the thermostatic switch is actuated to establish a circuit to the motor.

In accordance with the present invention, mechanical means responsive to the release of the layer of ice from plate 1 is provided for energizing the motor which rotates the breakers as illustrated more particularly in Figs. 10 and 14 of the drawings. For this purpose, a shaft 145 is provided which extends through a bushing 146 mounted in the rear wall 88 of the control box which has a retarding element 147, such as a vane or fin, secured to its inner end, the lower edge of which engages the upper surface of plate 1 and which becomes embedded in the layer of ice which is formed on plate 1 during the freezing cycle and fixed to the opposite end of shaft 141 is a bell crank lever, to one arm 148 of which is secured resilient means, such as a spring 149. The opposite end of spring 149 is secured to the extension 125a on the actuating arm 125 of switch 97 and when arm 125 of switch 97 is moved upwardly by arm 102, tension is placed on spring 149. The force of spring 149 when placed under tension is not sufficient, however, to actuate switch 97 nor is it sufficient to move vane 147 from the layer of ice during the adherence of the layer of ice to plate 1. When the upper surface of plate 1 is heated, however, to a sufficient extent to release the layer of ice therefrom, spring 149 moves vane 147 from its dotted line position as shown in Fig. 13 in which it is embedded in the layer of ice to its full line position in which the vane is removed from the layer of ice and during the movement of the vane from the layer of ice, the other arm 151 of the bell crank lever is moved into engagement with an actuator 151a of the second snap action switch 103.

Snap acting switch 103 as shown in Figs. 10 and 13 consists of a blade 152 to be actuated, an actuating arm 153 biased away from blade 152 and a U-shaped spring 154 loosely secured to projections extending from the free end portions of the blade and actuating arm and is somewhat similar to the switch shown in Figs. 9 to 14 of Patent No. 2,585,219 to which reference has been made. The blade 152 is provided with a movable contact 155 and when actuator 148 is moved from its dotted line to its full line position as shown in Fig. 13, it moves a pin 156 inwardly which engages and moves actuating arm 153 to a position in which the spring 154 throws blade 152 in the opposite direction, thereby forcing the movable contact 155 on blade 149 into engagement with a stationary contact 157.

When switch 103 is actuated, a circuit is established from line $L_1$ through conductor 158 to a motor 159 and from motor 159 through switch 103 and conductor 160 to terminal 133 of switch 97 and then through arm 122, conductor 136 and arm 112 to line $L_2$, thereby energizing motor 159.

Motor 159 is secured to the rear wall 88 of the control box and is provided with a shaft extending into the control box on which the pinion 104 is mounted and a train of reducing gearing is provided between pinion 104 and shaft 105 for slowly rotating shaft 105. As shown, pinion 104 is in mesh with a gear 161 fixed to a shaft 162 which is rotatable in bearings in the front and rear walls of the housing. A pinion 162a is also secured to shaft 162 which is in mesh with a gear 163 fixed to shaft 105 which is also rotatable in bearings in the front and rear walls of the control box and means in response to the rotation of shaft 105 is provided for conveying the layer of ice from plate 1 and breaking it into fragments. For this purpose, a shaft 164 is provided, the opposite ends of which extend through slots formed in the walls 17 and 20 of brackets 15 and 16 and which are journalled in bearings 165 and 166 secured to walls 17 and 20 of the brackets, and arranged upon shaft 164 are a plurality of breakers 167 which are spaced from each other by means of sprockets 168 as shown more particularly in Fig. 9. Breakers 167 and sprockets 168 are maintained in close fitting engagement with each other by suitable means, such as a nut 169 threaded on shaft 164 adjacent one end thereof and a snap ring 170 arranged adjacent the other end, and are rotatable with shaft 164.

Figure 6:
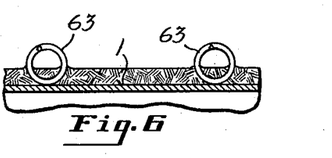
Fig. 6 is a sectional view taken on a plane passing through the line 6—6 of Fig. 5 looking in the direction of the arrows.

There is also arranged at the lower portion of plate 1 an idler roller 171 mounted on a shaft 172, the opposite ends of which shaft extend through slots in walls 25 and 29, respectively, of brackets 23 and 27 and are rotatable in bearings 173 and 174 and springs 63, each of which is in the form of an endless belt, are each trained around a sprocket on shaft 164 and the idler roller 171, the lower loop of each spring being preferably arranged in an annular depression in the idler roller 171. As previously stated, the lower flights of springs 63 become embedded in the ice which is formed as shown more particularly in Fig. 6 and means in response to the energization of motor 159 are provided for rotating shaft 164 and idler roller 171. For this purpose, the outer ends of shafts 105 and 164 have sprocket wheels 176 and 175, respectively, fixed thereto and a chain 177 is trained around the sprocket wheels and as shaft 164 is rotated in a clockwise direction as illustrated in Fig. 8, the layer of ice on plate 1 is conveyed by the portions of springs 63 embedded therein into contact with breakers 167 for breaking the ice into fragments.

Means associated with the breakers is also provided which aids the breakers in breaking the ice into fragments and which is adjustable to regulate the size of the fragments which are formed. As illustrated more particularly in Figs. 8 and 9, a breaker bar 178 is provided for this purpose, the lower portion of which is substantially cylindrical and which is provided with threaded openings to receive threaded studs 179 extending through the walls 17 and 20, respectively, of brackets 15 and 16. As the ice is passed between the breakers and the breaker bar, it will be apparent that it will be broken into fragments and to adjust the size of the fragments that are formed, the studs 179 may be loosened and the upper portion of the breaker bar may be adjusted relative to the breakers.

It will be noted that the breakers are larger in diameter than the sprockets and that the teeth of the breakers extend beyond the arc of travel of the endless spring belts in passing around the sprockets so that the teeth of the breakers in conjunction with the flexing of the springs as they pass around the sprockets and the breaker bar effectively break up the layer of ice into fragments. As illustrated in the drawings, each of the breakers consists of a pair of discs, each terminating in spaced teeth which disks are connected together by a collar slidable on shaft 164 and that a sprocket is arranged between each pair of breakers. As shown, each of the sprockets is provided with teeth which grip the spring riding thereon and when the springs ride over the sprockets, they are flexed which also aids in breaking the layer of ice into fragments. It will therefore be apparent that by utilizing a less number of springs, fragments of a larger size may be obtained. For instance, a sprocket may be arranged between each two pairs of breakers instead of between each pair of breakers as shown in the drawing and the number of springs that are utilized may be reduced to correspond with the number of sprockets. The size of the fragments which are formed may also be increased by reducing the number of breakers that are utilized. This may be effected by suitable means, such as by increasing the thickness of the sprockets to space the breakers further apart on shaft 164, or if desired, spacers may be utilized in place of some of the sprockets.

Means are also provided for conveying the ice fragments into a bin 10a arranged adjacent to the machine. For this purpose, a chute 180 is provided as shown more particularly in Figs. 1, 2 and 8 and while the chute may be mounted in any desirable manner, as shown, the upper portion of the chute is provided with an offset peripheral portion which is in engagement with a cover extending over the plate 1 and the conveying and breaking mechanism and the lower portion of which is arranged below a downwardly inclined extension 181 of plate 1 to receive the ice fragments and each side of the chute is provided with an arm 182 which may be welded or otherwise secured thereto, and which is secured to an outwardly extending lug 183 which is preferably formed integral with each bracket. As shown, the lower end of the chute extends through an opening in the bin.

During the rotation of shaft 164, means are also provided to restore the parts of the control means to their original positions. For this purpose, reducing gearing in the control box is provided including a pinion 184 secured to shaft 105 which meshes with a gear 185 supported for rotation upon a stud 186 secured to the rear wall 88 of the control box and gear 185 has a pinion 187 secured thereto or formed integral therewith which is in mesh with an idler pinion 188 which is also rotatably mounted on a stud 189 secured to rear wall 88 of the control box. Idler pinion 188, in turn, is in mesh with a gear 190 secured to a shaft 191, the opposite ends of which are journalled in bearings in the front and rear walls of the control box and means associated with shaft 191 and gear 191 is provided for actuating switch 97 to return its parts to their original position. For this purpose, an arm 106 is provided which may be formed of resilient material and mounted on shaft 191, or as shown, it may be pivotally mounted upon gear 190 in eccentric relation to shaft 1 and is provided with an outwardly extending end portion for engaging the extension 125a of switch 97 when gear 190 is rotated in a counter clockwise direction as shown in Fig. 10.

During the rotation of shaft 164 to convey the layer of ice between the breakers and the breaker bar, gear 190 is rotated through the train of gears 184, 185, 187 and 188 which are of such size and are arranged in such relation to each other that after shaft 164 has been rotated for sufficient time to remove the layer of ice from plate 1, arm 106 will be substantially in the position shown in Fig. 10 in which its outwardly extending end portion is in engagement with the extension 125a on arm 125 and its other end portion is substantially in engagement with shaft 191 and as gear 190 continues to rotate, arm 106 forces the actuating arm 125 downwardly to its full line position as shown in Fig. 10 which releases the tension on spring 149 to permit vane 147 to return to its original position and which again establishes circuits to energize motor 40 for driving the water pump and the motor 98 for rotating finger 100 over plate 1. Arm 106 then rotates on its pivot to its full line position shown in Fig. 12 in which position it does not interfere with the subsequent actuation of the switch by arm 102. In a like manner if the arm 106 is formed of resilient material and is mounted on shaft 191, energy is stored in the resilient arm which engages the extension 125 and when actuating arm 125 and its extension 125a are forced downward, the stored energy moves the arm 106 to a position beyond the extension 125a so that the actuating arm 125 and its extension 125a may be returned to the positions shown in Fig. 12 when the extension 125a is again engaged by arm 102. It will of course be understood that when the layer of ice is removed from plate 1, motor housing 99 and gear casing 101 rotate on shaft 139 to their original positions.

The actuation of switch 97 also interrupts the circuits to solenoid 82 and motor 159 and when the circuit to the solenoid is interrupted, valve 81 closes and cold vapors are again passed through the evaporator coils which are arranged in heat exchange relation to the inclined plate 1. The cycle is then repeated.

Means are provided, however, to shut off the machine when the quantity of ice in bin 10a reaches a predetermined level. It will be noted that the ice bin consists of inner and outer walls between which is interposed thermal insulating material. In accordance with the present invention, a well 193 is provided between the inner and outer walls of the cabinet in which the thermostatic switch is adjustably mounted. As shown, the thermostatic switch is connected to a flexible cable 194 containing conductors 109 and 110 which are secured to the terminals of the switch as shown diagrammatically in Fig. 16, and means are provided for maintaining the switch in any desired position in the well 193. As shown, a grommet 195 affixed to the top wall of the well is provided which is formed of suitable resilient material, such as rubber, and which is provided with an opening through which cable 194 extends and which frictionally holds the cable and the switch in any desired position in the well. The cable, however, may be forced downwardly to permit switch 107 to descend into the well or it may be pulled upwardly to position the switch in any desired position in the well. As shown diagrammatically in Fig. 16, the terminals of the switch are normally closed by a bimetallic arm 196 which opens when the ice in the bin reaches the level of the switch due to the change in temperature to which ti is exposed, thereby interrupting the circuit to relay 95 which opens and shuts off the machine. The machine may also be shut off manually, irrespective of the level of the ice in the bin, by manually opening switch 108 or by pulling out plug 94a.

As shown more particularly in Fig. 2, finger 100 is arranged over plate 1 and is provided with tapered ends which rotate over plate 1 until the layer of ice attains sufficient thickness to prevent rotation of the finger. In accordance with the present invention, means are provided for varying the distance of the finger from plate 1 to vary the thickness of the layer of ice which is formed upon plate 1 and while various means may be provided for this purpose, as illustrated in Fig. 15 of the drawings, the bearing 141 for shaft 140 is eccentrically mounted in a disc formed of a pair of plates 197 and 198 which are arranged in a circular opening in the rear wall 88 of the control box and which are provided with means for engaging the edges forming the opening. As shown, plate 197 is provided with an annular flange 199 engaging the outer side of the rear wall 88 of the control box and plate 198 is provided with an annular flange 200 which engages the inner side of the rear wall 88 of the control box and the plates are connected together by suitable means, such as a projection on plate 198 which extends tightly through an aperture in plate 197 for frictionally holding the plates together, and the bushing 141 is provided with flat portions 201 which may be engaged by a tool, such as a wrench, to rotate the disc to raise or lower bushing 141 and finger 100. It will be noted that bushing 141 is arranged below a cover 203 for plate 1 and the breakers and conveying mechanism and also below the upper wall 10 of the machine so that the distance of finger 100 from plate 1 may be set at the factory and will not be readily accessible to unskilled workmen.

If desired, however, means associated with the control box which is readily accessible to an operator may be provided for setting finger 100 at the desired distance from the plate to regulate the thickness of the layer of ice that is formed. This form of the invention is shown in Fig. 17 and comprises a suitable plate 204 which is provided with apertures 205 through which bolts may be inserted to secure the plate to the rear wall of the control box and which is provided with an opening 206 which is in alignment with the opening in the rear wall 88 of the control box. To provide the opening in the rear wall of the control box when this form of the invention is used, plates 197 and 198 as shown in Fig. 15 are omitted and an L-shaped lever 207 is provided which is pivotally mounted on plate 204 by a suitable pivot pin 208 arranged eccentric to the opening 206 and which carries the bushing 141 as shown in Fig. 17 of the drawing. The bushing 141 extends through the aligned openings in plate 207 and the rear wall and the bushing and finger 101 are normally arranged in a position to provide the minimum desired thickness of the ice by resilient means, such as a spring 209, one end of which is connected to a lug 210 on plate 204 and the opposite end of which is secured to a flange 211 extending outwardly from arm 207 and means are provided for actuating lever 207 to raise bushing 141 in the aligned openings in plate 204 and the rear wall of the control box. For this purpose, an actuator 212 is provided which is threaded through a nut 213 secured to a lug 214 extending outwardly from plate 204. As shown, the actuator 212 is also provided with means, such as a nut 215 for engaging flange 211 for moving lever 207 to raise the bushing and finger 100 to vary the thickness of the layer of ice which is to be formed upon plate 1 before the rotation of finger 101 is stopped by the ice.

What is claimed is:

1. Apparatus for preparing ice in the form of fragments including a thermally conductive plate, means for supporting said plate in an inclined position, means for simultaneously passing water downwardly over said plate and cold vapors in heat exchange relation therewith to freeze water passed downwardly thereon into a layer of ice, means for then heating the plate to a sufficient extent to release the layer of ice from the plate, means arranged adjacent the upper end portion of said plate for breaking the ice into fragments, and means for conveying the layer of ice upwardly on said plate into contact with said breaking means.

2. Apparatus for preparing ice in the form of fragments including a frame, a downwardly inclined thermally conductive plate supported in said frame, a shaft rotatably mounted in said frame adjacent to the upper end portion of said plate, a plurality of breakers mounted on said shaft and being rotatable therewith, means for simultaneously passing water downwardly over said plate and cold vapors in heat exchange relation with the plate to freeze water passing downwardly thereon into a layer of ice, means for then heating said plate to a sufficient extent to release the layer of ice which has been formed thereon, means for rotating said shaft when the layer of ice is released from said plate, and means associated with said shaft and the layer of ice for conveying the layer of ice upwardly on said plate into contact with said breakers for breaking the layer of ice into fragments.

3. Apparatus for preparing ice in the form of fragments including a frame, a downwardly inclined plate supported in said frame, a shaft rotatably mounted in said frame adjacent to the upper end portion of said plate, a plurality of breakers mounted on said shaft and rotatable therewith, means for simultaneously passing water downwardly over the upper surface of said plate and cold vapors in heat exchange relation with the plate to freeze water flowing downwardly thereon into a layer of ice, means for passing warm vapors in heat exchange relation with the lower surface of said plate for releasing the layer of ice from the plate, a motor for rotating said shaft, means for energizing said motor to rotate said shaft when the layer of ice is released from said plate, and means associated with said shaft and the layer of ice which is formed for conveying the layer of ice upwardly on said plate into contact with said breakers for breaking the ice into fragments.

4. Apparatus for preparing ice in the form of fragments including a frame, a thermally conductive plate supported in said frame, a shaft rotatably mounted in said frame in proximity to one end portion of said plate, a plurality of breakers mounted on said shaft and being rotatable therewith, means for simultaneously passing water over at least one surface of said plate and cold vapors in heat exchange relation with the plate to freeze water as it is passed over said plate to form a layer of ice thereon, means responsive to the formation of a layer of ice on said plate of a predetermined thickness for heating said plate to a sufficient extent to release the layer of ice therefrom, a motor for rotating said shaft, means for energizing said motor after the layer of ice has been released from said plate to rotate said breakers, and means associated with said shaft and the layer of ice which is formed for moving the layer of ice on said plate into contact with said breakers for breaking the ice into fragments.

5. Apparatus for preparing ice including a frame, a thermally conductive plate supported in said frame, a shaft rotatably mounted in said frame and extending in proximity to one end portion of said plate, a roller arranged adjacent to the opposite end portion of said plate, means for supporting said roller, a plurality of breakers mounted on said shaft and being rotatable therewith, gripping means arranged on said shaft between said breakers and being rotatable with said shaft, conveying means trained around each gripping means and said roller, a portion of which conveying means is arranged adjacent to said plate, means for simultaneously passing water over said plate and cold vapors in heat exchange relation with the plate to freeze water passing over the plate, and a portion of said conveying means being in sufficiently close relation to the surface of the plate to become embedded in the layer of ice which is formed, means for then heating said plate to a sufficient extent to release the layer of ice therefrom, and means responsive to the release of the layer of ice on said plate for rotating said shaft to move the layer of ice into contact with said breakers for breaking the ice into fragments.

6. Apparatus for preparing ice including a frame, a thermally conductive plate supported in said frame, a shaft rotatably mounted in said frame adjacent to one end portion of said plate, a plurality of breakers mounted on and being rotatable with said shaft, a plurality of sprockets rotatable with said shaft, each of which is arranged between a pair of breakers, a roller, means for supporting said roller adjacent to the other end portion of said plate, conveying means in the form of a plurality of endless coil springs entrained around each sprocket and said roller, and the lower flight of each of said springs being arranged adjacent to said plate, means for simultaneously passing water over the surface of said plate and cold vapors in heat exchange relation with said plate to freeze the water into a layer of ice in which a portion of each of said springs becomes embedded during the freezing of the layer of ice upon said plate, means for then heating the plate to a sufficient extent to release the layer of ice from said plate, and means responsive to the release of the ice on said plate for rotating said shaft and moving said springs for conveying the layer of ice into contact with said breakers for breaking the ice into fragments.

7. Apparatus for preparing ice in the form of fragments including a frame, a thermally conductive plate supported in said frame, a shaft rotatably mounted in said frame and extending adjacent to one end portion of said plate, breaker mechanism, said breaker mechanism consisting of a plurality of breakers mounted on said shaft and being rotatable therewith and a breaker bar mounted in said frame and having one of its longitudinal edge portions in spaced relation to said breakers, means for simultaneously passing water over at least one surface of said plate and cold vapors in heat exchange relation with said plate to freeze water as it is passed over said plate to form a layer of ice thereon, means responsive to the formation of a layer of ice on said plate of a predetermined thickness for heating said plate to a sufficient extent to release the layer of ice therefrom, a motor for rotating said shaft, means for energizing said motor to rotate said breakers after the layer of ice has been released from said plate, and means associated with said shaft and the layer of ice for conveying the layer of ice between said breakers and said breaker bar for breaking the ice into fragments.

8. Apparatus as defined in claim 7 in which the breaker bar is adjustable to vary the size of the ice fragments that are formed.

9. In apparatus for preparing ice including a thermally conductive plate on which a layer of ice is to be formed and in which means are provided for conveying the layer of ice from said plate, control means including a switch in which the switch parts are movable between first and second positions, a rotatable element for determining the thickness of the layer of ice which is to be formed on said plate, means for adjusting the distance of the rotative element relative to said plate to vary the thickness of the layer of ice which is to be formed on said plate, means responsive to the setting of the switch parts in their first positions for simultaneously passing water over at least one surface of said plate and cold vapors in heat exchange relation with said plate for freezing a layer of ice on said plate and for rotating said element over said plate, means associated with said rotatable element for actuating said switch when the layer of ice on said plate attains sufficient thickness to stop the rotation of said element, and means responsive to the movement of the switch parts to their second positions for heating said plate to a sufficient extent to release the layer of ice therefrom and for conveying the released layer of ice from said plate.

10. In apparatus for preparing ice including a thermally conductive plate on which a layer of ice to be formed and in which means are provided for conveying the layer of ice from the plate, control means including a control box having a rear wall, a switch having parts which are movable between first and second positions, a bushing secured to the rear wall of said control box and extending over said plate, a shaft extending through said bushing and having an element secured thereto for determining the thickness of the layer of ice which is to be formed, means responsive to the setting of the switch parts in their first positions for simultaneously passing water over at least one surface of said plate and cold vapors in heat exchange relation with said plate for freezing a layer of ice on said plate and for rotating said shaft and said element until the layer of ice which is formed upon the plate attains sufficient thickness to stop the rotation of said element, means associated with the shaft of said rotatable element for actuating said switch when the layer of ice stops the rotation of said element, means responsive to the movement of the switch parts to their second positions for heating said plate to sufficient extent to release the layer of ice therefrom and for conveying the released layer of ice from said plate, and means associated with the rear wall of said control box and said bushing whereby the distance of said bushing and said element relative to said plate may be varied to vary the thickness of the layer of ice which is formed.

11. In apparatus for preparing ice including a thermally conductive plate on which a layer of ice is to be formed and in which means are provided for conveying the layer of ice from said plate, control means including a control box having a rear wall provided with an opening, a lever pivotally secured to the rear wall of said box in eccentric relation to said opening and said lever being provided with a bushing extending through said opening which has a diameter which is substantially less than the diameter of said opening, a switch having parts which are movable between first and second positions, a shaft extending through said bushing and having an element secured thereto and extending over said plate for determining the thickness of the layer of ice which is to be formed on said plate, means responsive to the setting of the switch parts in their first positions for simultaneously passing water over at least one surface of said plate and cold vapors in heat exchange relation with said plate for freezing a layer of ice on said plate and for rotating said shaft and said element until the layer of ice which is formed on said plate attains sufficient thickness to stop the rotation of said element, means associated with the shaft of said rotatable element for actuating said switch when the layer of ice stops the rotation of said element, means responsive to the movement of the switch parts to their second positions for heating said plate to sufficient extent to release the layer of ice therefrom and for conveying the released layer of ice from said plate, resilient means for normally holding said lever and bushing in a position to provide a layer of ice of a desired minimum thickness, and means for actuating said lever to raise said bushing in the opening in the rear wall of the control box to vary the thickness of the layer of ice that is formed.

12. In apparatus for preparing ice including a thermally conductive plate and a first shaft, control means including a motor provided with a shaft, a switch having parts which are movable between first and second positions, means responsive to the setting of the switch parts in their first positions for simultaneously passing water over at least one surface of said plate and cold vapors in heat exchange relation with said plate for freezing a layer of ice on said plate, means responsive to the formation of a layer of ice of a predetermined thickness on said plate for actuating said switch to move its parts to their second positions, conveying means associated with the layer of ice which is formed on said plate and said first shaft, means responsive to the movement of the switch parts to their second positions for heating said plate to a sufficient extent to release the layer of ice therefrom and for energizing said motor, means associated with the motor shaft and the first shaft for rotating the first shaft for sufficient time to convey the released layer of ice from said plate, and means associated with the motor shaft and switch for again actuating the switch to return the switch parts to their first positions for deenergizing said motor and for returning the parts of said switch to their first positions to repeat the cycle.

13. In apparatus for preparing ice including a thermally conductive plate on which a layer of ice is to be formed and a first shaft, control means including a motor provided with a shaft, a switch having parts including an actuating arm which switch parts are movable between first and second positions upon movement of said actuating arm, means responsive to the movement of said actuating arm to its first position for simultaneously passing water over at least one surface of said plate and cold vapors in heat exchange relation with said plate for freezing a layer of ice on said plate, means responsive to the formation of a layer of ice of a predetermined thickness on said plate for moving said actuating arm to move the switch parts to their second positions, conveying means associated with the layer of ice that is formed on said plate and the first shaft, means responsive to the movement of the switch parts to their second positions for heating said plate to sufficient extent to release the layer of ice therefrom and for energizing said motor, means associated with the motor shaft and the first shaft for rotating the first shaft for sufficient time to convey the released layer of ice from said plate, and means including a train of reducing gears associated with the motor shaft and an arm mounted on the last gear of said train for engaging the actuating arm of said switch to return the parts of said switch to their first positions for repeating the cycle after the layer of ice has been removed from said plate.

14. In apparatus for preparing ice in the form of fragments including a thermally conductive plate, a first shaft, and a plurality of breakers mounted on and being rotatable with said shaft, control means including a motor provided with a shaft, a switch having parts which are movable between first and second positions, means responsive to the setting of the switch parts in their first positions for simultaneously passing water over at least one surface of said plate and cold vapors in heat exchange relation with said plate for freezing a layer of ice on said plate, means responsive to the formation of a layer of ice of a predetermined thickness on said plate for actuating said switch to move its parts to their second positions, conveying means associated with the layer of ice which is formed on said plate and the first shaft, means responsive to the movement of the switch parts to their second positions for heating said plate to sufficient extent to release the layer of ice therefrom and for energizing said motor, means associated with the motor shaft and the first shaft for rotating the first shaft for sufficient time to convey the released layer of ice into contact with said breakers for breaking the ice into fragments, an ice bin for receiving ice fragments from said breakers, means associated with the motor shaft and said switch for again actuating the switch to return the switch parts to their first position for energizing said motor and for returning the parts of said switch to their first positions to repeat the cycle, and thermostatic means arranged in the ice bin for shutting off the machine when the ice within the bin reaches a predetermined level.

15. Apparatus for preparing ice in the form of fragments including a thermally conductive plate, a rotatable shaft arranged adjacent one end portion of said plate, a motor for rotating said shaft, a plurality of breakers mounted on said shaft and being rotatable therewith, means for simultaneously passing water over at least one surface of said plate and cold vapors in heat exchange relation therewith to freeze water as it is passed over said plate into a layer of ice, means arranged in spaced relation to and substantially normal to said plate for engaging the layer of ice when the ice attains a predetermined thickness, means responsive to the engagement of the first mentioned means by said layer of ice for discontinuing the passage of water over said plate, for heating the plate to a sufficient extent to release the layer of ice therefrom, and for energizing said motor, and means associated with said shaft and the layer of ice which is formed for conveying the layer of ice into contact with said breakers to break the layer of ice into fragments during the rotation of said shaft.

16. Apparatus as defined in claim 15 in which the means responsive to the formation of a layer of ice of a predetermined thickness on the plate is adjustable away from and toward the plate to vary the thickness of the layer of ice which is formed.

17. In refrigerating apparatus, a switch provided with switch parts which are movable between first and second positions, means responsive to the setting of the switch parts in their first positions for initiating refrigeration to build up ice on the surface of a portion of said apparatus and the movement of said switch parts to their second positions being effective in interrupting refrigeration, an element arranged in proximity to the portion of the apparatus upon which ice is being built up which is spaced outwardly from and which is rotatable in a plane substantially normal to the apparatus upon which ice is being built up, means for rotating said element until the ice which is built up on said apparatus attains sufficient thickness to stop the rotation of said element, means associated with said driving means and being movable thereby for actuating said switch for moving its parts to their second positions to interrupt refrigeration when the movement of said element is stopped by the ice, and means whereby said element may be adjusted away from and toward the portion of the apparatus upon which ice is being built up to regulate the distance of said element from the apparatus on which ice is being built up so that the thickness of the ice that is built up on said apparatus which is required to stop the rotation of said element may be varied.

18. Apparatus for preparing ice including a thermally conductive plate, means for supporting said plate, conveying means including a plurality of resilient thermally conductive members having substantial portions engaging said plate and being arranged in spaced relation to each other, means for simultaneously passing water over the side of said plate engaged by said resilient members and cold vapors in heat exchange relation with said plate to freeze water passing over said plate and the portions of said thermally conductive members which engage said plate being effective in conducting cold from the plate to the water, thereby aiding in freezing the water passing over the plate into a layer of ice in which the portions of the thermally conductive members which engage the plate become embedded, means for then heating said plate to release the layer of ice therefrom, automatic means responsive to the release of the layer of ice from said plate for moving said thermally conductive members to convey the layer of ice from said plate, and means for flexing said resilient members to break the layer of ice into fragments as it is moved from said plate.

19. Apparatus for preparing ice including a thermally conductive plate, means for supporting said plate in an inclined position, conveying means including a plurality of thermally conductive coil springs extending downwardly over said plate in spaced relation to each other, at least a substantial number of the coils of each of said springs being in engagement with said plate, means for simultaneously passing water downwardly over the side of said plate engaged by said springs and cold vapors in heat exchange relation with the plate to freeze water passing downwardly over said plate and the portions of said springs which engage said plate being effective in conducting cold from said plate to the water, thereby aiding in freezing the water passing downwardly over the plate into a layer of ice in which the portions of said springs which engage said plate become embedded, means for then heating the plate to release the layer of ice therefrom, and means responsive to the release of the layer of ice for moving said springs to convey the layer of ice upwardly relative to said plate.

20. In refrigerating apparatus, a switch provided with switch parts which are movable between first and second positions, means responsive to the setting of the switch parts in their first positions for initiating refrigeration to build up ice on the surface of a portion of said apparatus and the movement of said switch parts to their second positions being effective in interrupting refrigeration, an element arranged in proximity to the portion of the apparatus upon which ice is being built up, all portions of which are spaced outwardly from that portion of said apparatus upon which ice is being built up and which is rotatable in a plane which is substantially perpendicular to the apparatus upon which ice is being built up, driving means for continuously rotating said element until the ice which is built up on said apparatus attains sufficient thickness to stop the rotation of said element, and means associated with said driving means and being movable thereby for actuating said switch for moving its parts to their second positions to interrupt refrigeration when the rotation of said element is stopped by the ice.

21. In refrigerating apparatus, a first switch provided with switch parts which are movable between first and second positions, means responsive to the setting of the switch parts in their first positions for initiating refrigeration to build up ice on the surface of a portion of said apparatus, a rotatable element arranged in proximity to but spaced outwardly from that portion of said apparatus upon which ice is being built up, driving means for continuously rotating said element until the ice which is built up on said apparatus attains sufficient thickness to stop the rotation of said element, means associated with said driving means and being movable thereby for actuating said switch to move its parts to their second positions when the rotation of said element has been stopped by the ice, means responsive to the movement of the switch parts to their second positions for interrupting refrigeration and for heating the portion of the apparatus upon which ice has been built up to release the ice therefrom, means independent of gravity for conveying the released ice from the apparatus, a second switch, means responsive to the movement of the parts of the first switch to their second positions and which becomes effective when the ice is released from the apparatus for actuating the second switch, and means responsive to the actuation of the second switch for energizing said conveying means for moving the ice from the apparatus.

22. In combination a refrigerated surface, means refrigerating said surface, means supplying water to said refrigerated surface for freezing ice thereupon, and control means supported above said refrigerated surface, said control means including a support, a motor pivotally supported upon said support, an ice engageable member mounted on said motor and rotatable by said motor, and means on said ice engaging member moving past an ice engaging position upon a predetermined amount of rotation, said ice engaging member engageable with ice in said ice engaging position when said ice reaches a predetermined thickness, and means actuated by the engagement of said ice engaging member with the ice to control refrigeration of said surface.

23. In combination with apparatus having a surface to be refrigerated, means for refrigerating said surface, means for supplying water to said refrigerated surface for freezing ice thereon, and control means, at least a portion of which is arranged above said surface, said control means including a support, a motor pivotally supported upon said support, a shaft rotatable by said motor, an ice-engaging member supported by and being rotatable in unison with said shaft, all portions of said ice-engaging member being spaced above that portion of the surface upon which ice is being built up and said ice-engaging member being rotatable in a plane which is substantially perpendicular to the surface of the apparatus upon which ice is being built up and in a position to be engaged by ice freezing on said surface when the ice attains a predetermined thickness, and means actuated in response to the engagement of said ice-engaging member with the ice to interrupt refrigeration of said surface.

(References on following page)

References Cited in the file of this patent

UNITED STATES PATENTS

| | | |
|---|---|---|
| 2,161,321 | Smith | June 6, 1939 |
| 2,241,624 | Smellie | May 13, 1941 |
| 2,418,572 | Brennan | Apr. 8, 1947 |
| 2,449,132 | Lucia | Sept. 14, 1948 |
| 2,524,815 | Leeson | Oct. 10, 1950 |
| 2,538,097 | Henderson | Jan. 16, 1951 |
| 2,549,747 | Leeson | Apr. 17, 1951 |
| 2,595,588 | Lee | May 6, 1952 |
| 2,602,304 | Randell | July 8, 1952 |
| 2,645,910 | Leeson | July 21, 1953 |
| 2,650,479 | Kattis | Sept. 1, 1953 |
| 2,682,155 | Ayres | June 29, 1954 |
| 2,685,952 | Hamlin | Aug. 10, 1954 |
| 2,693,680 | Lee | Nov. 9, 1954 |

FOREIGN PATENTS

| | | |
|---|---|---|
| 486,075 | Great Britain | May 30, 1938 |